United States Patent Office.

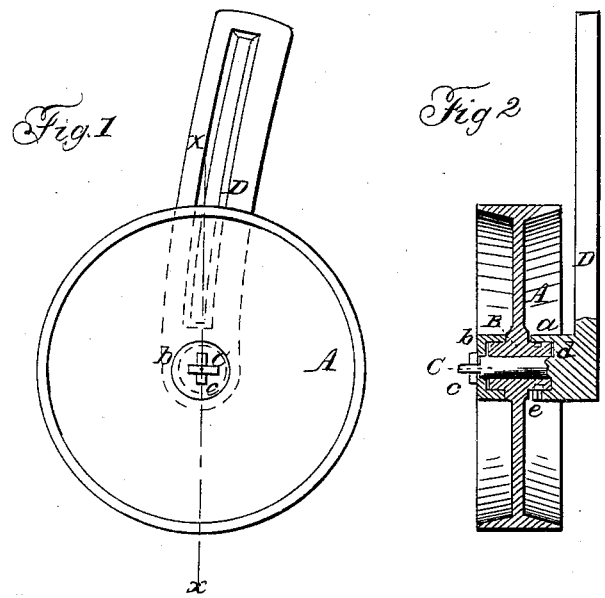

GEORGE DODGE, OF KALAMAZOO, MICHIGAN.

Letters Patent No. 67,513, dated August 6, 1867.

---

IMPROVEMENT IN PLOUGH-WHEEL.

---

The Schedule referred to in these Letters Patent and making part of the same.

---

TO ALL WHOM IT MAY CONCERN:

Be it known that I, GEORGE DODGE, of Kalamazoo, in the county of Kalamazoo, and State of Michigan, have invented a new and improved Plough-Wheel; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and useful improvement in gauge-wheels for ploughs. The invention is applicable to all ploughs, but is more especially designed for those which are provided with iron beams.

The object of the invention is to obviate the wear of the hub and axle and to exclude dust from the latter. To this end the invention consists in casting the hub of the wheel and also the axle of the same with a chill, and in providing a cap for the outer end of the hub, and a socket on the arm for the inner end of the same, and also in providing a means for the escape of dust before the same can come in contact with the axle. In the accompanying sheet of drawings—

Figure 1 is a side view of my invention.

Figure 2, a section of the same taken in the line $x\,x$.

Similar letters of reference indicate like parts.

A represents the wheel, which is of cast iron, and has its hub B cast with a "chill," as it is technically termed, in order to render it hard and durable, the melted metal being brought in contact with a metal surface in the mould. C represents the axle, which projects from the arm D which supports the wheel, and is attached to the plough-beam as usual. This axle is also cast with a chill, and the arm D is cast with a recess or socket, $a$, concentric with the axle, to receive the inner end of the hub B, the outer end of the latter being covered by a cap, $b$, (see fig. 2.) The cap is kept in place by a pin, $c$, passing through the end of the axle, the latter extending through the centre of the cap. In the inner part of the exterior of the hub there is a groove, $d$, extending circumferentially around it, and a slit or slot, $e$, is made through the socket $a$, as shown clearly in fig. 2. By this means any dirt or dust that may find its way between the hub and socket is allowed to escape. By this simple means the hub and axle are prevented from wear, and dust and dirt excluded from the axle.

Having thus described my invention, I claim as new, and desire to secure by Letters Patent—

1. A gauge-wheel for a plough, having its hub B and axle C cast with a chill, for the purpose set forth.

2. The recess $d$ in the exterior of the hub B of the wheel, in combination with the slit or slot $e$ in the socket $a$, substantially as and for the purpose specified.

3. The combination of the cap $b$ with a socket, $a$, applied to the hub B of the wheel and secured thereon, substantially in the manner as and for the purpose set forth.

The above specification of my invention signed by me this 3d day of June, 1867.

GEORGE DODGE.

Witnesses:
   J. D. SUMNER,
   A. H. RANDALL.